June 30, 1942.  J. GEA  2,288,085
ROASTER
Filed Dec. 3, 1940  2 Sheets-Sheet 1

Inventor
James Gea

By Clarence A. O'Brien
Attorney

June 30, 1942.　　　　J. GEA　　　　2,288,085
ROASTER
Filed Dec. 3, 1940　　　2 Sheets-Sheet 2
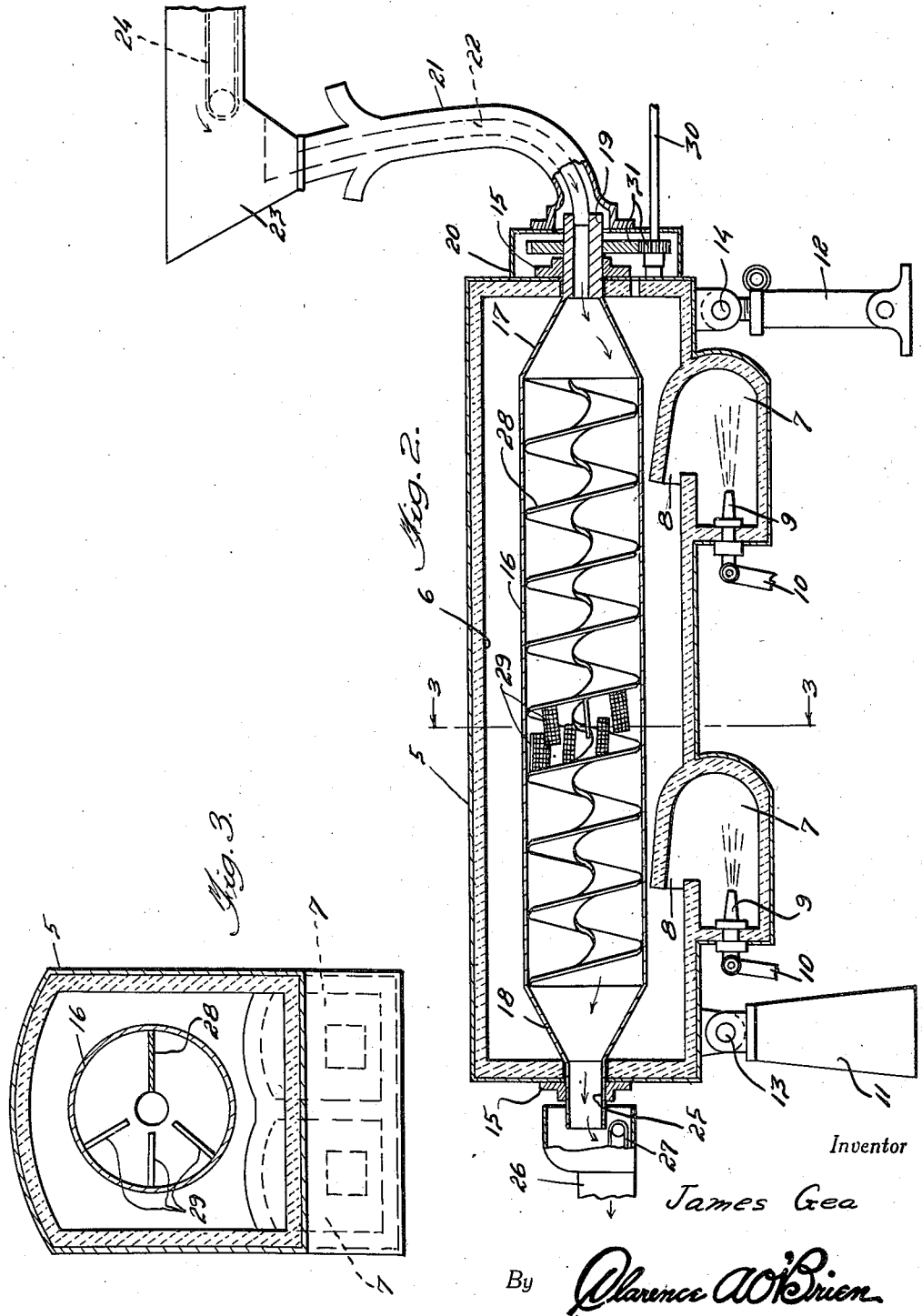
Inventor
James Gea
By Clarence A. O'Brien
Attorney Patented June 30, 1942.

2,288,085

UNITED STATES PATENT OFFICE 2,288,085

ROASTER

James Gea, Joliet, Ill., assignor of one-fourth to Palmer Di Giulio and one-fourth to Fiore Di Giulio, both of Joliet, Ill.

Application December 3, 1940, Serial No. 368,410

1 Claim. (Cl. 34—58)

This invention relates to what may be called a roaster, the object of the invention being to provide a device for agitating, pulverizing, and filtering material from which baking powder is produced; and consists in the provision of a device whereby heat is employed to advantage for obtaining the pulverizing action.

A further object of the invention is to provide a device of this character embodying such a construction, combination and arrangement of elements whereby the device may be bodily set at a desired angle to the horizontal to insure passage of the raw material therethrough by gravity.

The invention together with its objects and advantages will be best understood from a study of the following description taken in connection with the accompanying drawings wherein—

Figure 2 is a longitudinal sectional view therethrough with certain parts shown in elevation.

Figure 3 is a transverse sectional view taken substantially on the line 3—3 of Figure 2.

Figure 1:
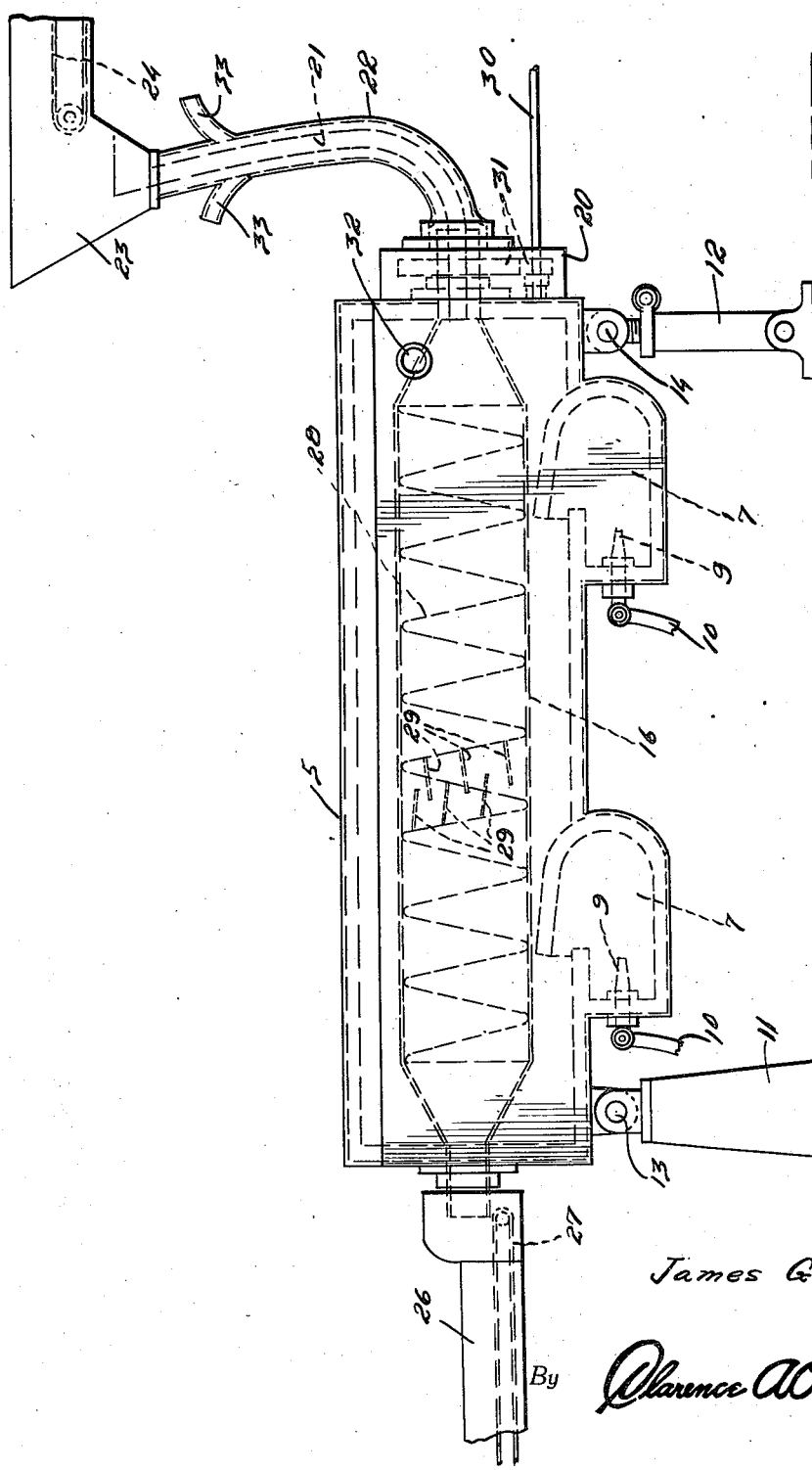
Figure 1 is a side elevational view of a roaster embodying the features of the present invention.

Referring more in detail to the drawings it will be seen that in the preferred embodiment thereof, the roaster embodies an elongated casing 5 lined with refractory material 6 as shown and provided at the bottom thereof with opposed pairs of heating chambers 7—7 and from which heat passes into the casing 5 through passages 8—8 opening from the chambers 7 into the casing 5.

While any suitable heat-producing means may be employed, in the present instance oil burners are illustrated and the nozzles thereof extend into the chambers 7, as shown in Figure 2. The nozzles are indicated by the reference numerals 9—9 and are connected with the oil supply through the medium of conduits 10—10.

The casing 5 is supported by a standard 11 and a jack 12.

At one end thereof the casing 5 is pivoted to the standard 11 as at 13 while at an opposite end thereof the casing 5 is pivoted to the jack 12 as at 14.

Disposed longitudinally within the casing 5 and rotatably supported by bearings 15—15 mounted at opposite ends of the casing 5 is a conveyor drum 16.

At the respective opposite ends thereof the drum 16 is tapered as at 17, 18, and at the end 17 thereof, which may be termed the inlet end, the drum 16 is provided with a cylindrical inlet nozzle 19 that extends through a gear case 20 to terminate within one end of a flexible tube 21.

The tube 21 encases a feed tube 22 as shown.

The raw material is fed to the drum 16 from a hopper 23 through the tube 22 that is connected with the hopper, and the material, from the source of supply, is fed to the hopper through the medium of a conveyor fragmentarily suggested in Figure 2 and indicated by the reference numeral 24.

At the end 18 thereof, which may be termed the discharge end, the drum 16 is provided with a cylindrical discharge neck 25 that discharges into the enlarged end of a conveyor casing 26.

Casing 26 houses a conveyor 27 that serves to carry off the processed material to the place of use.

The material, passing through the drum 16 from the end 17 to the end 18 thereof, is caused to take a sinuous path through the medium of a spiral screw or flange 28 fixedly mounted in the drum and having the peripheral edges thereof permanently united with the wall of the drum 16.

Intermediate the ends of the spiral 18 there are provided filtering screens 29 that are arranged in staggered relation as shown and through which the finer material passes, and from this point on in the length of the drum 16 proceeds to the outlet end of the drum in advance of the coarser particles of the material.

For revolving the drum 16, drive is transmitted thereto from a suitable source of power (not shown) and through a shaft 30 that is in driving engagement with the drum 16 through the medium of gearing 31 housed in the aforementioned gear case 20 as shown in Figure 2.

It will be seen that the drum 16 may be supported at the desired angle of adjustment relative to the horizontal by raising the end of the drum connected as at 14 to the jack 12. With the drum 5 at the desired angle to the horizontal, it will be apparent that the raw material being fed to the drum 16 from the hopper 23 will pass by gravity through the drum 16, following the course defined by the spiral 28, and discharging from the drum 16 through the outlet thereof onto the conveyor 27 to be carried to the desired point remote from the device.

It will be apparent that the burners serve to heat the casing 5 and consequently the wall of the drum 16. Also as the raw material moves through the drum, the material, by the action of centrifugal force, is directed outwardly toward the peripheral wall of the drum to be maintained in contact with the hot wall of the drum, and in the course of its passage through the drum 16 the material breaks up and crumbles. Those lumps of the material, which have not been sufficiently broken up by the time they reach the screens 29, are lifted around the sides of the drum and then slide in a zig-zag course resulting in a further crumbling or crushing of such particles. The final material passes through the filtering means 29 and thus moves forward ahead of the coarser material. As a result of the turning action of the drum and the force of gravity, the material is finally expelled through the outlet 25 of the drum onto the conveyor 27.

The casing 5 is also provided with a suitable exhaust stack 32 while the casing 21 for the tube 22 is provided with outlets 33; it being apparent that casing 21 serves to convey some of the products of combustion around the outside of the tube 22 for heating the tube and consequently the raw material as it passes through the tube from the hopper 23 to the drum 16.

It is thought that the simplicity of the device as well as its operation and advantages will be clear to those skilled in the art without further detailed description.

It is also to be understood that while I have herein illustrated and described the preferred embodiment of the invention, I claim all such forms of the invention to which I am entitled in view of the prior art and scope of the appended claim.

Having thus described the invention what is claimed as new is:

In an apparatus for processing raw material a revoluble drum having a helical flange fixedly mounted internally thereof and extending substantially from one end to the opposite end of the drum to provide a spiral course for raw material passing through the drum, and said helical flange, intermediate the ends thereof having opposed portions provided with filtering elements extending in a circular series; the filtering elements associated with each of the said opposed portions of the flanges terminating short of the next adjacent and opposed portion and in staggered overlapping relation with reference to the filtering elements associated with the other of said opposed portions and said filtering elements being disposed in the path of material traveling through the drum.

JAMES GEA.